United States Patent [19]

Pettit

[11] 4,299,422
[45] Nov. 10, 1981

[54] WINDOW BOOT FOR TRUCK-CAMPER COMBINATIONS AND THE LIKE

[76] Inventor: John E. Pettit, 18219 - 46th Pl., South, Seattle, Wash. 98188

[21] Appl. No.: 146,429

[22] Filed: May 5, 1980

[51] Int. Cl.³ ............................................. B60P 3/32
[52] U.S. Cl. ...................................... 296/166; 138/93
[58] Field of Search ............... 296/166, 1 R, 164, 156, 296/100, 101; 180/84; 52/2, 208; 138/89, 90, 93

[56] References Cited

U.S. PATENT DOCUMENTS

| | | | |
|---|---|---|---|
| 3,194,466 | 7/1965 | Davis | 138/90 X |
| 3,593,749 | 7/1971 | Reardon | 138/93 |
| 3,779,068 | 12/1973 | Forsythe | 138/90 X |
| 3,900,224 | 8/1975 | Copeland | 296/166 |
| 4,093,301 | 6/1978 | Kwok | 296/100 |
| 4,093,302 | 6/1978 | Adams | 296/100 X |

*Primary Examiner*—David M. Mitchell
*Assistant Examiner*—Norman L. Stack, Jr.
*Attorney, Agent, or Firm*—LeBlanc, Nolan, Shur & Nies

[57] ABSTRACT

A flexible, plastics material boot for insertion within the adjacent opened windows in a camper, cap or canopy and truck combination. A central flexible tunnel has two inflatable toroidal chambers at the tunnel ends which are simply pushed or popped into placed after chamber inflation. No other attachment of any kind is required to install the boot in place.

5 Claims, 4 Drawing Figures

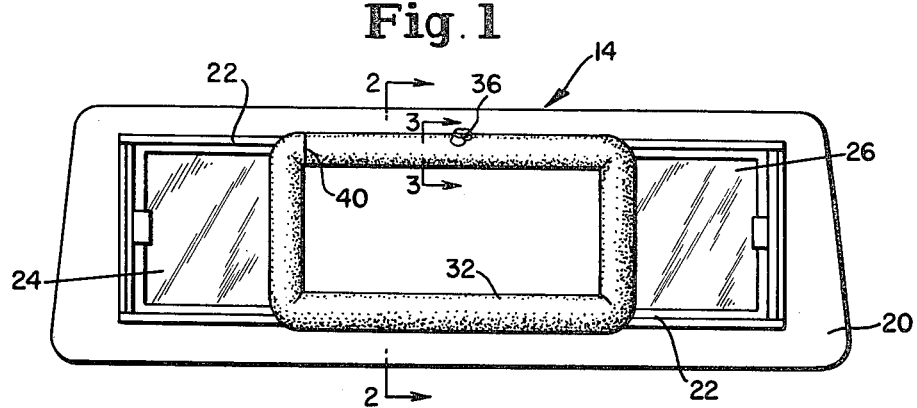
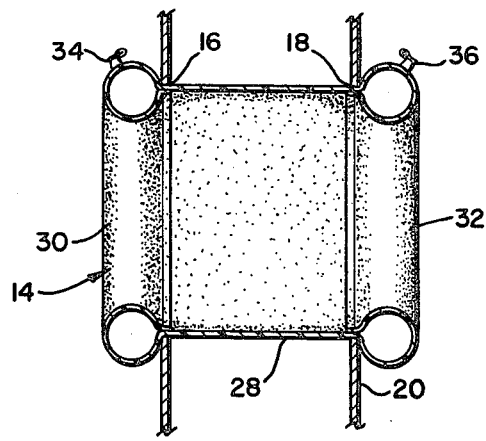
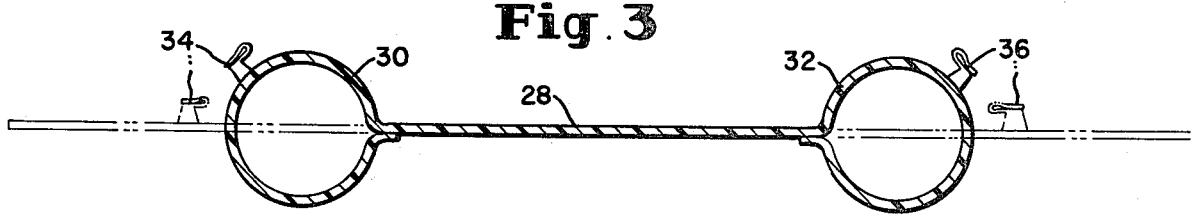
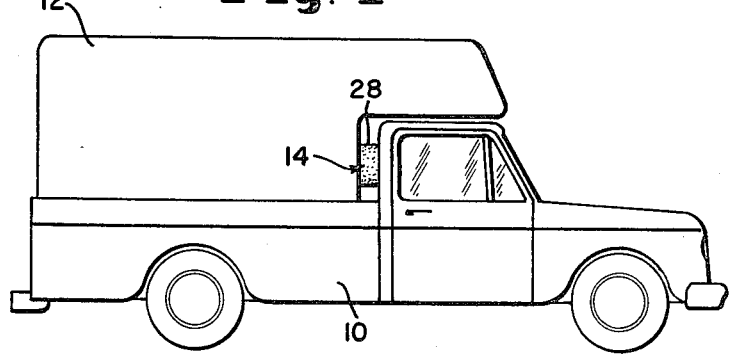

WINDOW BOOT FOR TRUCK-CAMPER COMBINATIONS AND THE LIKE

BACKGROUND OF THE INVENTION

This invention relates generally to passageway structures for interconnecting truck and camper, cap or canopy combinations and more particularly to an improved, easily installed and removed boot structure.

Trucks having campers carried by the truck commonly include a rear window on the cab of the truck in approximate registry with a window on a forward wall of the camper. It is desirable to interconnect or intercouple windows with a tunnel assembly which is sealed within the window openings of the cab and camper windows so that dirt, debris and weather are kept outside while providing communication between the truck cab and the camper body.

Commonly, such passageway tunnels or boots are permanently or semi-permanently installed in the window openings of the camper or cab or both window openings. The following five prior art patents are representative of the current state of the art. U.S. Pat. No. 3,321,234, issued May 23, 1967 to W. L. Harrell et al, discloses an assembly including a panel which completely replaces the rear window of the truck cab, and a rigid, rectangular tunnel interconnecting the panel in the cab with the camper. U.S. Pat. Nos. 3,625,560, issued Dec. 7, 1971 to R. M. Bjork; 3,844,603, issued Oct. 29, 1974 to R. M. Bjork et al; and 3,853,348, also issued to R. M. Bjork et al, each disclose a boot permanently mounted within the camper with a semirigid, forwardly extended tunnel which fits in the truck cab window opening without need of altering the cab window opening. U.S. Pat. No. 3,900,224 discloses a boot with a flexible tunnel which is installed with rigid frame members behind the respective truck cab and camper window openings without need of altering either window opening.

Conversely, the present invention provides a boot for interconnecting the window openings of a truck cab and camper combination which is installed and removed at will in a few seconds without need of any installation tools, frames, staples, snaps, etc., of any kind whatsoever. The boot is of simple, uncomplicated structure and is readily manufactured from a simple rectangular sheet of vinyl or other plastics material. The boot includes a flexible tunnel with inflatable, toroidal chambers at each end of the tunnel which are simply popped into place behind the respective window openings of the truck cab and camper. The inflated boot is of no self-defined shape and thus is conformed easily to the window openings in which it is installed. When not in use, the boot may be deflated and folded into a compact size for storage.

SUMMARY OF THE INVENTION

Accordingly, it is a principal object of the invention to provide a boot for interconnecting the respective window openings of a truck cab and camper, cap or canopy mounted on the truck, the boot including a flexible tunnel with inflated toroidal chambers at the ends of the tunnel, the boot being installed and removed easily simply by popping the boot into place in the window openings.

It is another object of the invention to provide a flexible inflatable boot structure for interconnecting the window openings of a truck cab and camper combination, the boot being made from a single sheet of flexible, vinyl or other plastics material, the completed boot having no self-defined shape so that it may be easily inserted into window openings of varying length and width dimensions.

It is a further object of the invention to provide a boot for interconnecting the window openings of a truck and camper combination, the boot having a flexible tunnel with inflatable, toroidal chambers at each end of the tunnel, the boot being of rather uncomplicated structure and thus low in cost of manufacture.

Generally, the invention is made from a single sheet of vinyl or other plastics material, the ends of which are joined to form a cylinder and the sides of which are equipped with inflators and then folded inwardly on the body of the cylinder and seamed thereto, to provide a completed boot with a central tunnel having two inflatable toroidal chambers at each end of the tunnel. After the chambers are inflated, the boot is installed by simply popping the boot into the window openings and conforming it to the shape of the openings by hand. Due to the simplicity and flexibility of structure of the boot and the absence of any self-defined shape, marketing of the boot in but two sizes provides a universal boot structure which will accommodate all known truck cab and camper, cap or canopy combinations. When not in use, the boot is simply deflated and folded into a small, compact package for ready storage.

BRIEF DESCRIPTION OF THE DRAWINGS

Other and more complete objects and advantages of this invention will become readily apparent by reference to the following detailed specification and drawings in which:

FIG. 1 is an interior, elevation view of the rear panel of a conventional truck cab with the boot installed;

FIGS. 2 and 3 are section views taken along lines 2—2 and 3—3 of FIG. 1, respectively, and drawn to an enlarged scale; and FIG. 4 is a side, elevation view of a truck and camper combination with the boot installed.

DESCRIPTION OF THE PREFERRED EMBODIMENT

Referring now to the drawings by reference character, FIG. 4 thereof illustrates a truck 10 having a camper 12 mounted thereon. Obviously, truck 10 and camper 12 form no part of the instant invention, per se, and are completely conventional. The window boot 14 of this invention is illustrated in a position inserted in the open windows 16 of the camper and 18 of the truck cab (FIG. 2).

A typical cab interior rear wall 20 is illustrated in FIG. 1 having tracks 22 within which are mounted a pair of sliding windows 24, 26. Similarly, camper 12 has a generally mating opening and may be equipped with similar structure of about the same dimensions (not shown). Window boot 14 of this invention includes a flexible, plastics material (e.g., vinyl) tunnel 28 having toroidal, inflatable chambers 30, 32 at each end thereof. Chamber 30 has an oral inflator 34 and chamber 32 has an oral inflator 36. Inflators 34, 35 are otherwise common and conventional.

As shown in FIG. 3, boot 14 may be economically formed from a simple, rectangular piece of vinyl material. Chambers 30, 32 are formed by simply folding two long sides of the sheet back onto the remaining center portion and heat seaming the long ends to the centerpiece in conventional fashion, at 38. Prior to this, of course, oral inflators 34, 36 will have been fixed in a portion of the material which will form chambers 30, 32, respectively. Then the two opposed ends of the structure are heat seamed together at 40 (FIG. 1), again in a conventional manner well known in the plastics manufacturing business, to complete the formation of the boot.

Insertion of the boot is a very easy task. First, chambers 30, 32 are inflated. Then, with the camper and cab windows having been opened, the boot is simply pushed into place with chamber 32 in cab 20 and chamber 30 in camper 12. Since the boot is completely flexible, it can be pushed or formed into the general rectangular shape of the windows in which it is inserted with minimal effort. Additionally, chambers 30 and 32, when inflated, are sufficiently shape retaining to assure a rather secure installation of boot 14. Because of the flexibility of structure of the invention, it can be marketed in just two sizes: small, to fit compact cabs and campers, and a large size to fit standard sized truck cabs and campers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use between the adjacent window or passageway openings in the cab of a vehicle and a removable vehicle component on the vehicle such as a camper, cap or canopy, a passageway seal assembly or boot comprising: a flexible material tunnel having an external circumference approximately the same as the internal circumference of the passageway openings within which the boot is installed; and inflatable, toroidal chambers at each end of the tunnel, each chamber being of sufficient dimensions to be retained by the passageway openings outside of the space between the passageway openings, which is filled by the tunnel.

2. The boot as claimed in claim 1 wherein each toroidal chamber further comprises inflation means for filling each chamber with a fluid.

3. The boot as claimed in claim 1 wherein said boot is made from a single, rectangular sheet of vinyl plastic material, the short side or ends of said sheet being joined to form a cylinder from said sheet, the long sides of said sheet then being folded inwardly and sealed to said sheet to form elongate tubes, to complete the assembly of said boot.

4. A method of manufacturing a boot for use in adjacent passageway openings of a truck and camper, cap or canopy combination, from a single sheet of elongate, rectangular, flexible plastics material comprising the steps of: joining the short sides or ends of the sheet to thereby form a cylinder; and folding the long sides of the sheet inwardly and sealing the edges of the long sides to the body of the sheet to thereby form a complete boot having a central cylinder or tunnel with elongate, tubular chamber at each end of the tunnel.

5. The method of manufacture of a boot as claimed in claim 4, further comprising the step of installing oral inflation means in each of the elongate tubes.

* * * * *